(12) United States Patent
Fletcher et al.

(10) Patent No.: US 7,930,390 B2
(45) Date of Patent: Apr. 19, 2011

(54) IDENTIFICATION METHOD

(75) Inventors: Benjamin Joseph Fletcher, Huddersfield (GB); Christopher Phillips, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 12/013,673

(22) Filed: Jan. 14, 2008

(65) Prior Publication Data

US 2009/0182761 A1    Jul. 16, 2009

(51) Int. Cl.
*G06F 15/173* (2006.01)
*G06F 7/00* (2006.01)
*G06F 11/00* (2006.01)
*G06Q 40/00* (2006.01)

(52) U.S. Cl. ............. 709/224; 707/758; 726/34; 705/43

(58) Field of Classification Search .................. 709/224; 705/43, 44, 64; 707/758; 726/34
See application file for complete search history.

(56) References Cited

U.S. PATENT DOCUMENTS

| | | | |
|---|---|---|---|
| 6,433,685 B1 * | 8/2002 | Struble et al. | 340/571 |
| 6,804,699 B1 * | 10/2004 | Henrie | 709/203 |
| 7,194,438 B2 | 3/2007 | Sovio et al. | |

FOREIGN PATENT DOCUMENTS

WO    WO2006/000864 A2    1/2006

OTHER PUBLICATIONS

Dellutri et al.; Local Authentication with Bluetooth enabled Mobile Devices; Proceedings of the Joint International Conference on Autonomic and Autonomous Systems and International Conference on Networking and Services (ICAS/ICNS 2005; 2005 IEEE; 6 pages.

* cited by examiner

*Primary Examiner* — Hassan Phillips
*Assistant Examiner* — Tanim M Hossain
(74) *Attorney, Agent, or Firm* — Schmeiser, Olsen & Watts; Robert E. Straight

(57) ABSTRACT

An identification method and system. The method includes receiving by a computing system from a first entity, first data indicating that an electronic device is missing. The computing system receives from a transaction device reader, second data comprising first identification information associated with the electronic device and third data comprising second identification information associated with a second entity and a transaction device belonging to the second entity. The computing system transmits notification data indicating that the electronic device, the second entity, and the transaction device are located within a specified vicinity of the transaction device reader. The computing system receives log data associated with the second entity and fourth data associated with missing electronic devices. The computing system compares the fourth data to the log data and generates results data to determine if the second entity is associated the missing electronic devices or the electronic device.

18 Claims, 4 Drawing Sheets

IDENTIFICATION METHOD

FIELD OF THE INVENTION

The present invention relates to a method and associated system for locating a missing device.

BACKGROUND OF THE INVENTION

Locating a missing item typically comprises an inaccurate process with little flexibility. Accordingly, there exists a need in the art to overcome at least some of the deficiencies and limitations described herein above.

SUMMARY OF THE INVENTION

The present invention provides a method comprising:

receiving, by a computing system from a first entity, first data indicating that a first electronic device is missing, wherein said first electronic device belongs to said first entity, and wherein said computing system comprises a memory system;

receiving, by said computing system from a first transaction device reader, second data comprising first identification information associated with said first electronic device, said first electronic device located within a specified vicinity of said first transaction device reader;

receiving, by said computing system from said first transaction device reader, third data comprising second identification information associated with a second entity and a first transaction device belonging to said second entity, said second entity and said first transaction device located within said specified vicinity of said first transaction device reader;

transmitting, by said computing system to a first company associated with said first transaction device, first notification data indicating that said first electronic device, said second entity, and said first transaction device are located within said specified vicinity of said first transaction device reader;

receiving, by said computing system from said first company in response to said transmitting said first notification data, log data associated with said second entity and said first transaction device;

receiving, by said computing system, fourth data associated with missing electronic devices;

comparing, by said computing system, said fourth data to said log data;

generating, by said computing system in response to said comparing said fourth data to said log data, first results data used to determine if said second entity is associated with any missing electronic device of said missing electronic devices;

generating, by said computing system, first associations data based on said first results data, wherein said first associations data is used to determine if said second entity is associated with said first electronic device; and storing, by said computing device in said memory system, said first results data and said first associations data.

The present invention provides a method comprising:

receiving, by a computing system from a first entity, first data indicating that a first transaction device is missing, wherein said first transaction device belongs to said first entity, and wherein said computing system comprises a memory system;

receiving, by said computing system from a first transaction device reader, second data associated with said first transaction device, said first transaction device located within a specified vicinity of said first transaction device reader;

receiving, by said computing system from said first transaction device reader, third data comprising first identification information associated with a first electronic device belonging to a second entity, wherein said second entity and said first electronic device are located within said specified vicinity of said first transaction device reader;

transmitting, by said computing system to a first company associated with said first electronic device, first notification data indicating that said first electronic device, said second entity, and said first transaction device are located within said specified vicinity of said first transaction device reader;

receiving, by said computing system from said first company in response to said transmitting said first notification data, log data associated with said first electronic device;

receiving, by said computing system, fourth data associated with missing transaction devices;

comparing, by said computing system, said fourth data to said log data;

generating, by said computing system in response to said comparing said fourth data to said log data, first results data used to determine if said second entity is associated with any missing transaction device of said missing transaction devices;

generating, by said computing system, first associations data based on said first results data, wherein said first associations data is used to determine if said second entity is associated with said first transaction device; and storing, by said computing device in said memory system, said first results data and said first associations data.

The present invention advantageously provides a simple method and associated system capable of locating a missing item.

DETAILED DESCRIPTION OF THE INVENTION

Figure 1:
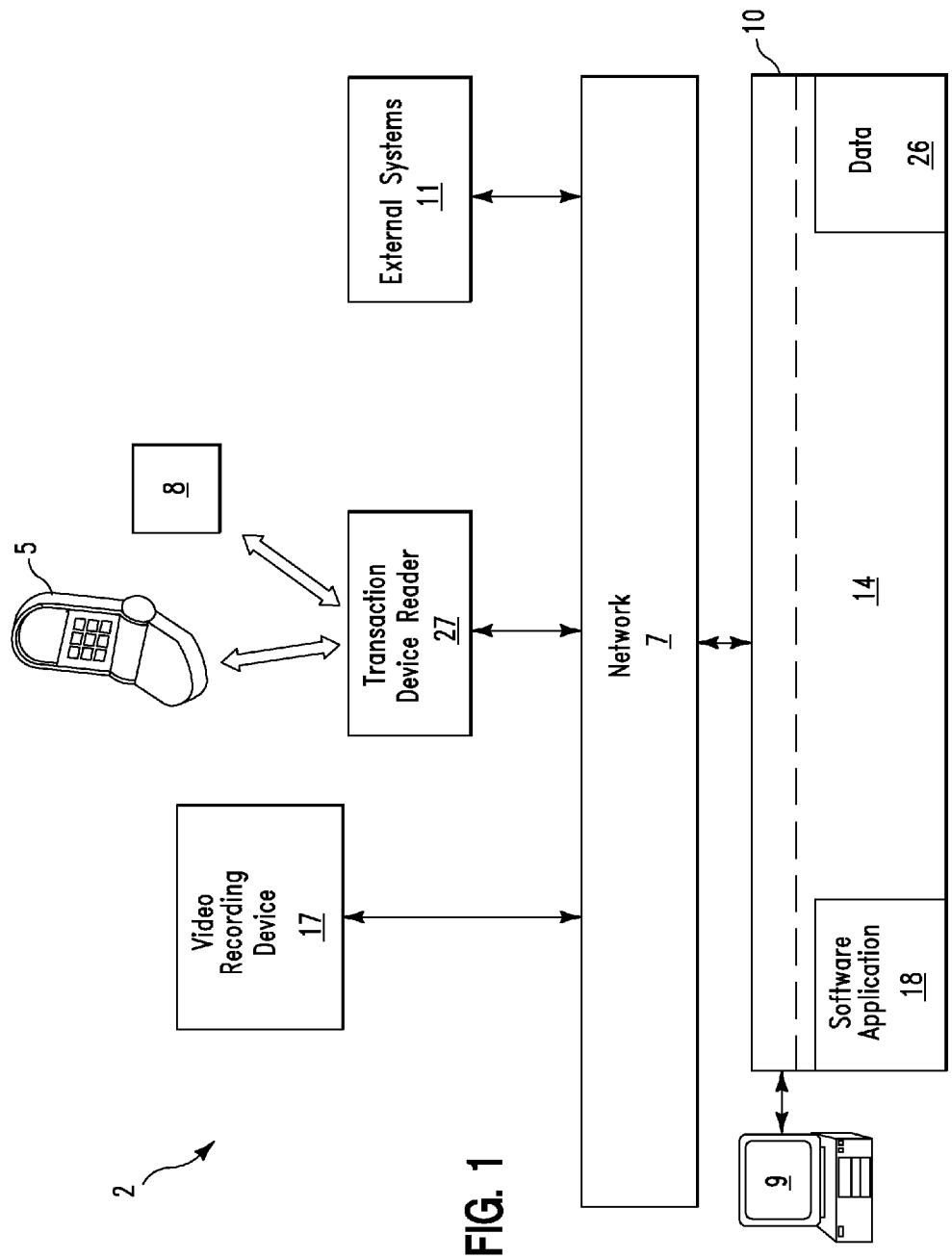
FIG. 1 illustrates a system for identifying and locating a missing device, in accordance with embodiments of the present invention.

FIG. 1 illustrates a system 2 for identifying and locating a missing device, in accordance with embodiments of the present invention. The missing device may comprise an electronic device 5 or a transaction device 8. Electronic device 5 is defined herein as a device capable of generating, transmitting, and receiving electrical signals. Electronic device 5 may comprise any type of electronic device including, inter alia, a cellular telephone, a personal digital assistant (PDA), an audio/video device (e.g., an MP3 player, a compact disk player, a video player, etc), a computer, a pager, a camera, etc. Transaction device 5 is defined herein as a device capable of performing transactions. Transaction device 5 may comprise any type of transaction device including, inter alia, a credit/debit card, an electronic ticketing card (e.g., an oyster card), a gasoline purchase swipe card, etc.

System 2 of FIG. 1 comprises a transaction device reader 27, a video recording device 17, and external systems 11 connected to a computing system 10 through a network 7. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14 (e.g., a database). Memory system 14 comprises a software application 18 and data 25. System 2 may comprise an optional access terminal 9 connected to computing system 10. Software application 18 controls all functions associated with retrieving and cross referencing data (e.g., data 25) in order to identify and locate a missing device. Optional access terminal 9 may be used to access, execute, and/or update software application 18. Transaction device reader 27 may comprise any apparatus capable of reading and/or detecting transaction device 5 including, inter alia, a credit card machine, an automated teller machine (ATM), an oyster card reader, etc. Video recording device 17 may comprise any type of device capable of recording a video signal and transmitting a video signal to computing system 10. External systems 11 may comprise any systems (e.g., computing systems, databases, etc) that comprise data that may be used to assist in a process for locating a missing device (e.g., electronic device 5 or a transaction device 8) and/or a person that is in possession of the missing device. External systems 11 may comprise, inter alia, systems associated with insurance companies, credit card companies, banks, law enforcement entities (e.g., police departments, the federal bureau of investigation (FBI), etc.), etc.

System 2 may be used to identify and locate a missing device (e.g., electronic device 5 or a transaction device 8) and/or a person that is in possession of the missing device in accordance with the following scenarios.

Scenario 1

In this scenario, electronic device 5 belongs to a first person (or entity) and transaction device 8 belongs to a second person. The second person is in possession of electronic device 5 and transaction device 8 (e.g., the second person stole electronic device 5 from the first person). The following steps illustrate a process for locating electronic device 5 and identifying the second person.

1. Computing system receives a notification that electronic device 5 is missing.
2. The second person in possession of electronic device 5 and transaction device 8 travels to transaction device reader 27 (e.g., an ATM machine) and performs a transaction (e.g., to withdraw cash) using transaction device 8 (e.g., an ATM card).
3. Transaction device reader 27 detects electronic device 5. For example, transaction device reader 27 may detect electronic device 5 via any type of wireless identification technique including, inter alia, a Bluetooth identification signal of electronic device 5, a MAC address of electronic device 5, etc.
4. Video recording device 17 may optionally record pictures or video of the second person at transaction device reader 27 performing the transaction.
5. Information retrieved in steps 2-4 (e.g., identification information associated with electronic device 5, transaction device 8, and the second person) is transmitted to computing system 10.
6. Computing system 10 notifies a company (e.g., a bank) associated with transaction device 8 that transaction device 8 and electronic device 5 have been detected within a specified vicinity of transaction device reader 27.
7. Information associated with transaction device 8 and the second person (e.g., log information illustrating transaction device 8 usage) is cross-referenced with information retrieved from external systems 11 (e.g., information associated with stolen electronic devices retrieved from insurance companies) to determine if the second person has used transaction device 8 (or other transaction devices) within a vicinity of additional stolen electronic devices.
8. If the second person has used transaction device 8 (or other transaction devices) within a vicinity of the additional stolen electronic devices then it may be determined that the second person is possibly in possession of the missing electronic device 5.
9. Computing system 10 may generate an alert (i.e., specifying that the second person is possibly in possession of the missing electronic device 5) and transmit the alert to a proper authority (e.g., a police department).

Scenario 2

In this scenario, transaction device 8 belongs to a first person (or entity) and electronic device 5 belongs to a second person. The second person is in possession of electronic device 5 and transaction device 8 (e.g., the second person stole transaction device 8 from the first person). The following steps illustrate a process for locating transaction device 8 and identifying the second person.

1. Computing system receives a notification that transaction device 8 is missing.
2. The second person in possession of transaction device 8 and electronic device 5 travels to transaction device reader 27 (e.g., an ATM machine) and performs a transaction (e.g., to withdraw cash) using the missing transaction device 8 (e.g., an ATM card).
3. Transaction device reader 27 detects electronic device 5. For example, transaction device reader 27 may detect electronic device 5 via any type of wireless identification technique including, inter alia, a Bluetooth identification signal of electronic device 5, a MAC address of electronic device 5, etc.
4. Video recording device 17 may optionally record pictures or video of the second person at transaction device reader 27 performing the transaction.
5. Information retrieved in steps 2-4 (e.g., identification information associated with electronic device 5, transaction device 8, and the second person) is transmitted to computing system 10.
6. Computing system 10 notifies a company (e.g., a telephone company) associated with electronic device 5 that transaction device 8 and electronic device 5 have been detected within a specified vicinity of transaction device reader 27.
7. Information associated with electronic device 5 and the second person (e.g., log information illustrating electronic device 5 usage) is cross-referenced with information retrieved from external systems 11 (e.g., information associated with stolen transaction devices) to determine if the second person has used electronic device 5 within a vicinity of additional stolen transaction devices.
8. If the second person has used electronic device 5 within a vicinity of the additional stolen transaction devices then it may be determined that the second person is possibly in possession of the missing transaction device 8.
9. Computing system 10 may generate an alert (i.e., specifying that the second person is possibly in possession of the missing transaction device 8) and transmit the alert to a proper authority (e.g., a police department).

Figure 2:
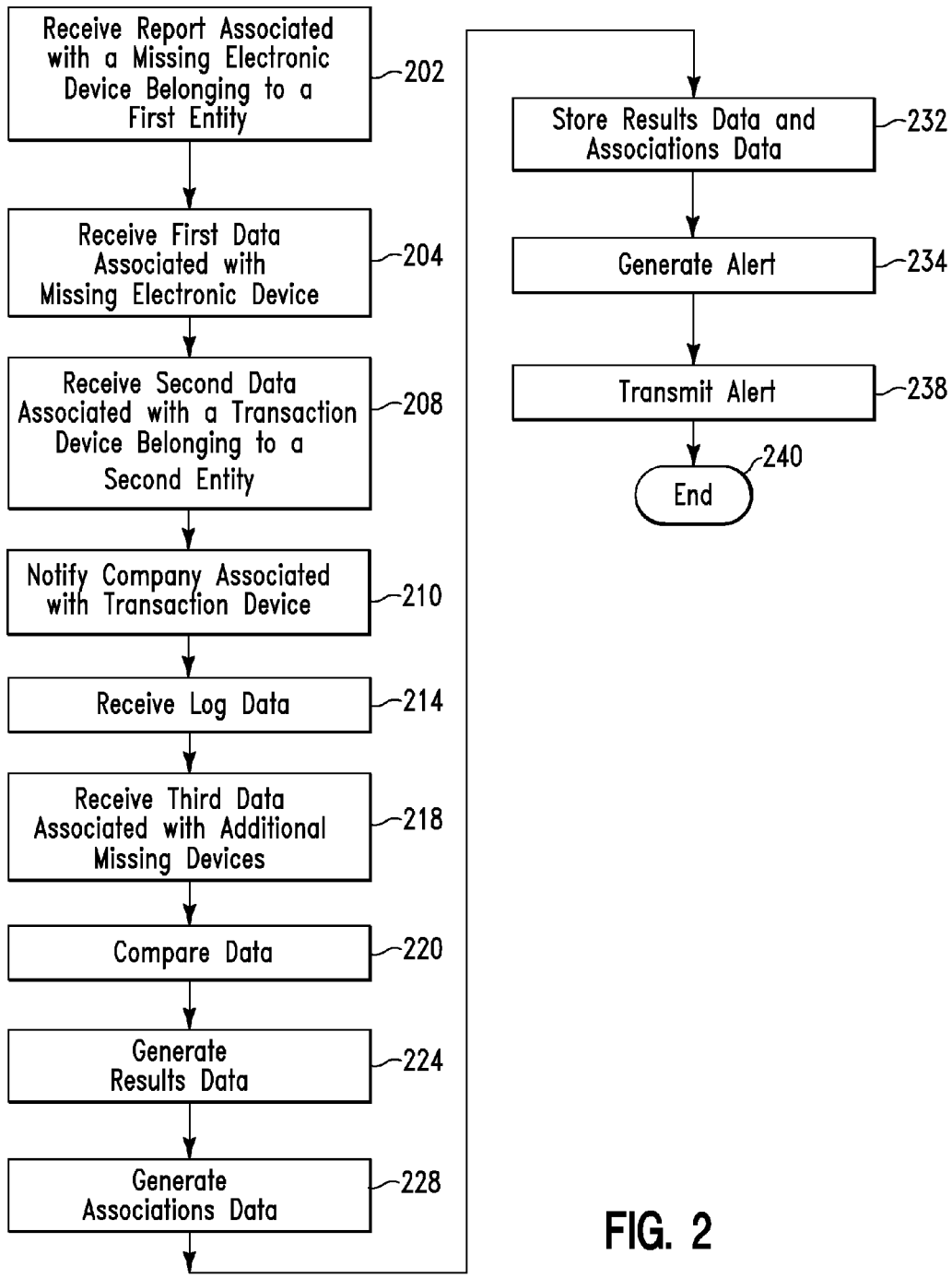
FIG. 2 illustrates a flowchart describing an algorithm used by the system of FIG. 1 for identifying and locating a missing electronic device, in accordance with embodiments of the present invention.

FIG. 2 illustrates a flowchart describing an algorithm used by system 2 of FIG. 1 for identifying and locating a missing electronic device, in accordance with embodiments of the present invention. In step 202, a computing system (e.g., computing system 10 of FIG. 1) receives (i.e., from a first entity), a report indicating that an electronic device (e.g., electronic device 5 of FIG. 1) is missing (e.g., has been stolen). The electronic device belongs to the first entity. In step 204, a second entity in possession of the electronic device and a transaction device (i.e., the transaction device belongs to the second entity) travels to a transaction device reader (e.g., an ATM machine) and performs a transaction (e.g., to withdraw cash) using the transaction device (e.g., an ATM card). The transaction device reader detects the electronic device (i.e., via a wireless technology such as, inter alia, a Bluetooth detection device) and transmits first data (i.e., identification data associated with the electronic device) to the computing system. The computing system receives (i.e., from the transaction device reader) the first data. In step 208, the computing system receives (i.e., from the transaction device reader) second data comprising identification information associated with the second entity and the transaction device. In step 210, the computing system transmits (i.e., to a first company associated with the transaction device) notification data indicating that the electronic device, the second entity, and the transaction device are located within a specified vicinity of the transaction device reader. In step 214, the computing system receives (i.e., from the first company in response to the notification data) log data associated with the second entity and the transaction device. The log data may comprise transaction records associated with the second entity and the transaction device. For example, the transaction records may include ATM withdrawal records including dates, times, and locations for withdrawal transactions performed by the second entity (i.e., using the transaction device). In step 218, the computing system receives (e.g., from external systems 11 in FIG. 1) third data associated with additional missing electronic devices. The third data may comprise data received from insurance companies that track stolen electronic devices. In step 220, the computing system compares the third data from step 218 to the log data from step 214. In step 224, the computing system generates results data (i.e., in response to the comparing from step 220). The results data is used to determine if the second entity has used the transaction device near any of the additional missing electronic devices. In step 228, the computing system generates associations data based on the results data. The associations data is used to determine if the second entity is in possession of the electronic device. In step 232, the computing system stores the results data and the associations data. In step 234, an alert (i.e., indicating that the second entity is in possession of the electronic device) is generated. In step 238, the alert is transmitted to a proper authority (e.g., a police department) and the process terminates in step 240.

Figure 3:
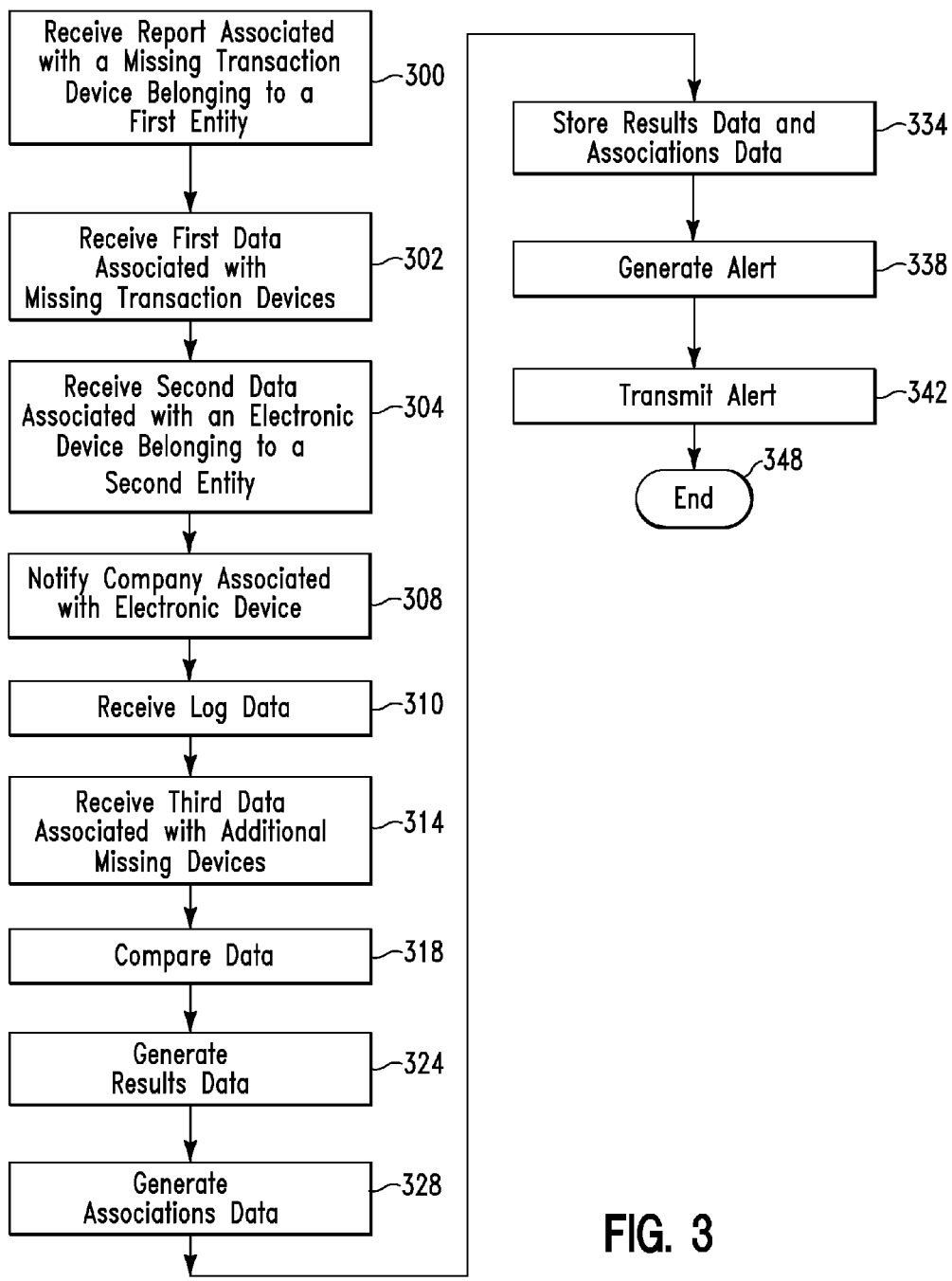
FIG. 3 illustrates a flowchart describing an algorithm used by the system of FIG. 1 for identifying and locating a missing transaction device, in accordance with embodiments of the present invention.

FIG. 3 illustrates a flowchart describing an algorithm used by system 2 of FIG. 1 for identifying and locating a missing transaction device, in accordance with embodiments of the present invention. In step 300, a computing system (e.g., computing system 10 of FIG. 1) receives (i.e., from a first entity), a report indicating that a transaction device (e.g., transaction device 8 of FIG. 1) is missing (e.g., has been stolen). The transaction device belongs to the first entity. In step 302, a second entity in possession of the transaction device and an electronic device (i.e., the electronic device belongs to the second entity) travels to a transaction device reader (e.g., an ATM machine) and performs a transaction (e.g., to withdraw cash) using the transaction device (e.g., an ATM card). The computing system receives (i.e., from the transaction device reader) first data associated with the transaction device. In step 304, the transaction device reader detects the electronic device (i.e., via a wireless technology such as, inter alia, a Bluetooth detection device) and transmits second data (i.e., identification data associated with the electronic device and the second entity) to the computing system. The computing system receives (i.e., from the transaction device reader) the second data. The computing system receives (i.e., from the transaction device reader) the first data. In step 308, the computing system transmits (i.e., to a first company associated with the electronic device) notification data indicating that the electronic device, the second entity, and the transaction device are located within a specified vicinity of the transaction device reader. In step 310, the computing system receives (i.e., from the first company in response to the notification data) log data associated with the second entity and the electronic device. The log data may comprise transaction/usage records associated with the second entity and the electronic device. For example, the transaction records may include phone usage records including dates, times, and locations for phone usage associated with the second entity (i.e., using the electronic device). In step 314, the computing system receives (e.g., from external systems 11 in FIG. 1) third data associated with additional missing transaction devices. The third data may comprise data received from insurance companies that track stolen transaction devices (e.g., stolen ATM cards). In step 318, the computing system compares the third data from step 314 to the log data from step 310. In step 324, the computing system generates results data (i.e., in response to the comparing from step 318). The results data is used to determine if the second entity has used the electronic device near any of the additional missing transaction devices. In step 328, the computing system generates associations data based on the results data. The associations data is used to determine if the second entity is in possession of the transaction device. In step 334, the computing system stores the results data and the associations data. In step 338, an alert (i.e., indicating that the second entity is in possession of the transaction device) is generated. In step 342, the alert is transmitted to a proper authority (e.g., a police department) and the process terminates in step 348.

Figure 4:
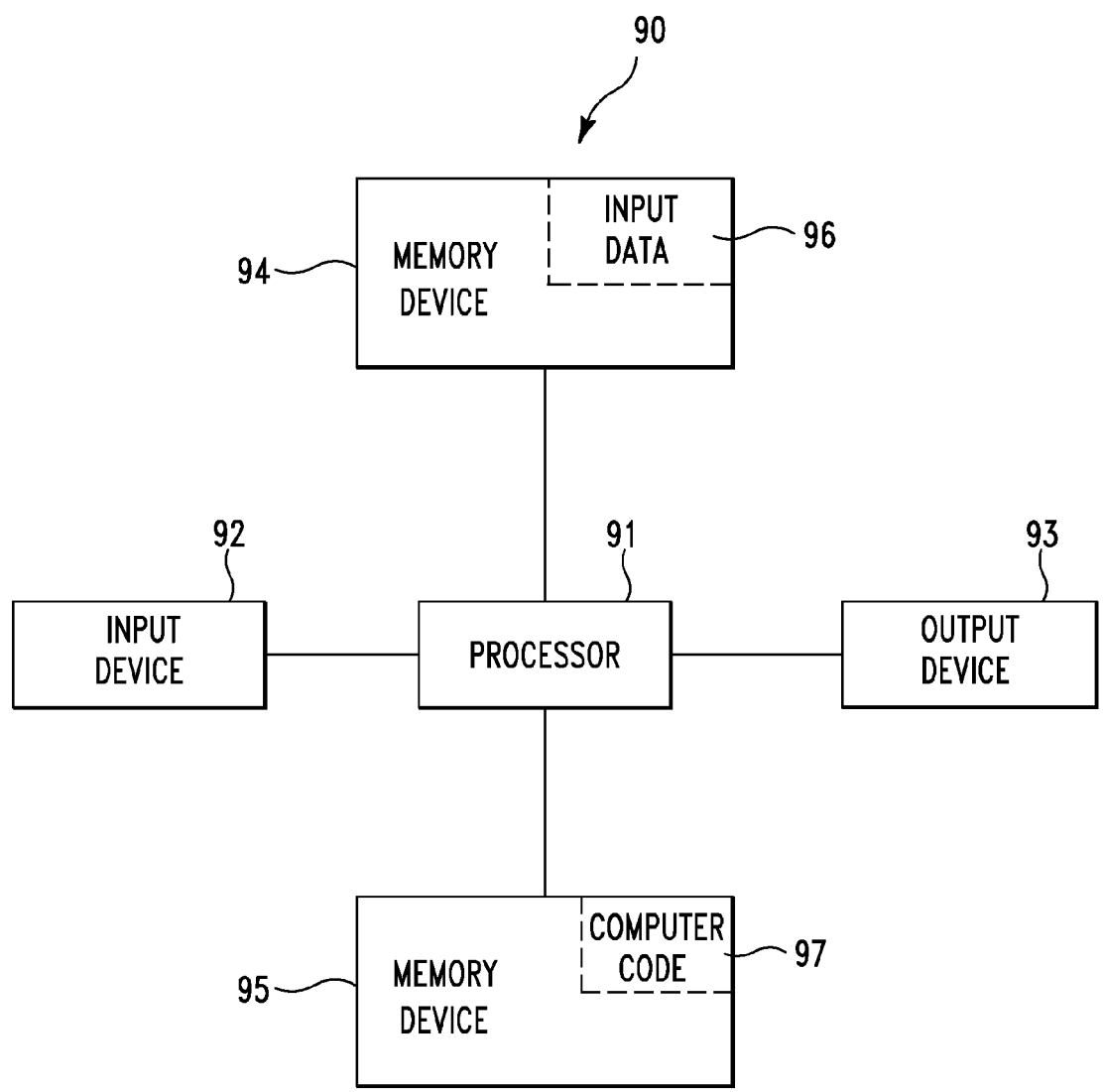
FIG. 4 illustrates a computer apparatus used for performing a process for identifying and locating a missing device, in accordance with embodiments of the present invention.

FIG. 4 illustrates a computer apparatus 90 (e.g., computing system 10 of FIG. 1) used for identifying and locating a missing device, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for identifying and locating a missing device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2-3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to identify and locate a missing device. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for identifying and locating a missing device. In another embodiment, the invention provides a business method that performs the process steps of the invention on a subscription, advertising, and/or fee basis. That is, a service provider, such as a Solution Integrator, could offer to perform a process for identifying and locating a missing device. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   receiving, by a computing system from a first entity, first data indicating that a first electronic device is missing, wherein said first electronic device belongs to said first entity, and wherein said computing system comprises a memory system;
   receiving, by said computing system from a first transaction device reader, second data comprising first identification information associated with said first electronic device, said first electronic device located within a specified vicinity of said first transaction device reader;
   receiving, by said computing system from said first transaction device reader, third data comprising second identification information associated with a second entity and a first transaction device belonging to said second entity, said second entity and said first transaction device located within said specified vicinity of said first transaction device reader, wherein said first transaction device comprises a monetary transaction card, wherein said first transaction device reader comprises a monetary transaction card reader;
   transmitting, by said computing system to a first company associated with said first transaction device, first notification data indicating that said first electronic device, said second entity, and said first transaction device are located within said specified vicinity of said first transaction device reader;
   receiving, by said computing system from said first company in response to said transmitting said first notification data, log data associated with said second entity and said first transaction device;
   receiving, by said computing system, fourth data associated with missing electronic devices;
   comparing, by said computing system, said fourth data to said log data;
   generating, by said computing system in response to said comparing said fourth data to said log data, first results data used to determine if said second entity is associated with any missing electronic device of said missing electronic devices, wherein said first results data determines that said second entity is associated with at least one missing electronic device of said missing electronic devices;
   generating, by said computing system, first associations data based on said first results data, wherein said first associations data is used to determine if said second entity is associated with said first electronic device, wherein said associations data determines that said second entity is in possession of said first electronic device; and
   storing, by said computing device in said memory system, said first results data and said first associations data
   enabling, by said computing system, a video recording device, said video recording device located within said specified vicinity of said first transaction device reader;
   receiving, by said computing system from said video recording device, video images associated with said second entity; and
   transmitting, by said computing system, said video images to a proper authority.

2. The method of claim 1, wherein said first results data determines that said second entity is associated with at least one missing electronic device of said missing electronic devices, wherein said associations data determines that said second entity is associated with said first electronic device, and wherein said method further comprises:
   generating, by said computing system, an alert associated with said first results data and said associations data; and
   transmitting, by said computing system, said alert to a proper authority.

3. The method of claim 2, wherein said proper authority comprises an entity selected from the group consisting of a police department, an insurance company, and said first company.

4. The method of claim 1, further comprising:
   receiving, by said computing system from a third entity, fifth data indicating that a second electronic device is missing, wherein said second electronic device belongs to said third entity;
   receiving, by said computing system from a second transaction device reader, sixth data comprising third identification information associated with said second electronic device, said second electronic device located within a specified vicinity of said second transaction device reader;
   receiving, by said computing system from said second transaction device reader, said third data, said second entity and said first transaction device located within said specified vicinity of said second transaction device reader;
   transmitting, by said computing system to said first company associated with said first transaction device, second notification data indicating that said second electronic device, said second entity, and said first transaction device are located within said specified vicinity of said second transaction device reader;

generating, by said computing system, second associations data based on said first results data and said second notification data, wherein said second associations data is used to determine if said second entity is associated with said second electronic device; and storing, by said computing device in said memory system, said second associations data.

5. The method of claim 1, wherein said first electronic device comprises a device selected from the group consisting of a cellular telephone, a pager, an audio/video device, a personnel digital assistant, and a computer.

6. The method of claim 1, wherein said first transaction device comprises a device selected from the group consisting of a credit card, a debit card, and an oyster card.

7. The method of claim 1, wherein said first transaction device reader is an automated teller machine (ATM).

8. The method of claim 1, wherein said fourth data comprises media access control (MAC) addresses of said missing electronic devices.

9. A computing system comprising a processor coupled to a computer-readable memory unit, said memory unit comprising instructions that when executed by the processor implements the method of claim 1.

10. A computer program product, comprising a computer readable storage device comprising a computer readable program code embodied therein, said computer readable program code configured to perform the method of claim 1 upon being executed by a processor of said computing system.

11. A method comprising:

receiving, by a computing system from a first entity, first data indicating that a first transaction device is missing, wherein said first transaction device belongs to said first entity, wherein said first transaction device comprises a monetary transaction card, and wherein said computing system comprises a memory system;

receiving, by said computing system from a first transaction device reader, second data associated with said first transaction device, said first transaction device located within a specified vicinity of said first transaction device reader, wherein said first transaction device reader comprises a monetary transaction card reader;

receiving, by said computing system from said first transaction device reader, third data comprising first identification information associated with a first electronic device belonging to a second entity, wherein said second entity and said first electronic device are located within said specified vicinity of said first transaction device reader;

transmitting, by said computing system to a first company associated with said first electronic device, first notification data indicating that said first electronic device, said second entity, and said first transaction device are located within said specified vicinity of said first transaction device reader;

receiving, by said computing system from said first company in response to said transmitting said first notification data, log data associated with said first electronic device;

receiving, by said computing system, fourth data associated with missing transaction devices;

comparing, by said computing system, said fourth data to said log data;

generating, by said computing system in response to said comparing said fourth data to said log data, first results data used to determine if said second entity is associated with any missing transaction device of said missing transaction devices, wherein said first results data determines that said second entity is associated with at least one missing transaction device of said missing transaction devices;

generating, by said computing system, first associations data based on said first results data, wherein said first associations data is used to determine if said second entity is associated with said first transaction device, wherein said associations data determines that said second entity is in possession of said first transaction device; and storing, by said computing device in said memory system, said first results data and said first associations data enabling, by said computing system, a video recording device, said video recording device located within said specified vicinity of said first transaction device reader;

receiving, by said computing system from said video recording device, video images associated with said second entity; and transmitting, by said computing system, said video images to a proper authority.

12. The method of claim 11, wherein said first results data determines that said second entity is associated with at least one missing transaction device of said missing transaction devices, wherein said associations data determines that said second entity is associated with said first transaction device, and wherein said method further comprises:

generating, by said computing system, an alert associated with said first results data and said associations data; and transmitting, by said computing system, said alert to a proper authority.

13. The method of claim 12, wherein said proper authority comprises an entity selected from the group consisting of a police department, an insurance company, and said first company.

14. The method of claim 11, further comprising:

receiving, by said computing system from a third entity, fifth data indicating that a second transaction device is missing, wherein said second transaction device belongs to said third entity;

receiving, by said computing system from a second transaction device reader, sixth data associated with said second transaction device, said second transaction device located within a specified vicinity of said second transaction device reader;

receiving, by said computing system from said second transaction device reader, said third data, wherein said second entity and said first electronic device are located within said specified vicinity of said second transaction device reader;

transmitting, by said computing system to said first company associated with said first transaction device, second notification data indicating that said first electronic device, said second entity, and said second transaction device are located within said specified vicinity of said second transaction device reader;

generating, by said computing system, second associations data based on said first results data and said second notification data, wherein said second associations data is used to determine if said second entity is associated with said second transaction device; and storing, by said computing device in said memory system, said second associations data.

15. The method of claim 11, wherein said first electronic device comprises a device selected from the group consisting of a cellular telephone, a pager, an audio/video device, a personnel digital assistant, and a computer.

16. The method of claim 11, wherein said first transaction device comprises a device selected from the group consisting of a credit card, a debit card, and an oyster card.

17. The method of claim 11, wherein said first transaction device reader is an automated teller machine (ATM).

18. The method of claim 11, wherein said first electronic device comprises a wireless transmitter.

* * * * *